(12) United States Patent
Hirsch

(10) Patent No.: US 11,087,381 B2
(45) Date of Patent: Aug. 10, 2021

(54) METHOD FOR SIMULTANEOUSLY ONE-STEP FILLING A VIRTUAL SHOPPING CART WITH MANY ITEMS FROM ONE OR MULTIPLE RESOURCES; ALL ITEMS OF ANY TYPE OR CHARACTERISTICS FROM POTENTIAL RESOURCES WHICH HAVE BEEN EMBODIED INTO A CUSTOMIZED LIST WHICH HAS BEEN SIMULTANEOUSLY GENERATED AND SOURCED IN ONE-STEP THEN PRESENTED VISUALLY TO USER TO SELECT ITEMS; CULMINATING AND RESULTING ACQUISITION TO BE SIMULTANEOSLY PLACED IN A SINGLE VIRTUAL SHPPING CART AND ALL ARE ACQUIRED SIMULTANEOUSLY FROM MANY SOURCE

(71) Applicant: Dvorah Hirsch, New York, NY (US)

(72) Inventor: Andrea Hirsch, New York, NY (US)

(*) Notice: Subject to any disclaimer, the term of this patent is extended or adjusted under 35 U.S.C. 154(b) by 0 days.

(21) Appl. No.: 15/704,066

(22) Filed: Sep. 14, 2017

(65) Prior Publication Data
US 2018/0005305 A1    Jan. 4, 2018

Related U.S. Application Data

(63) Continuation-in-part of application No. 13/776,695, filed on Feb. 25, 2013, now abandoned, and a
(Continued)

(51) Int. Cl.
*G06Q 30/06*    (2012.01)

(52) U.S. Cl.
CPC ..... *G06Q 30/0633* (2013.01); *G06Q 30/0625* (2013.01); *G06Q 30/0641* (2013.01)

(58) Field of Classification Search
CPC ...................... G06Q 30/0601–0643
See application file for complete search history.

(56) References Cited

U.S. PATENT DOCUMENTS

| | | | |
|---|---|---|---|
| 7,197,475 B1 * | 3/2007 | Lorenzen | G06Q 30/02 235/383 |
| 7,637,426 B1 * | 12/2009 | Green | G06Q 30/06 235/383 |

(Continued)

OTHER PUBLICATIONS

Rising issues forecommerce businesses: Shopping cart abandonment. (Nov. 16, 2012). PR Newswire Retrieved from https://dialog.proquest.com/professional/docview/1152982873?accountid=131444.*

*Primary Examiner* — Resha Desai
(74) *Attorney, Agent, or Firm* — The Law Firm of Andrea Hence Evans, LLC

(57) ABSTRACT

A method for Simultaneously in one-step filling a Virtual Shopping Cart with many items from one or multiple resources at one time; all items of any type from all potential resources are embodied into a Customized List of All Items, which has been Simultaneously generated and sourced from all potential resources in one-step and then presented visually to the User in a unique format from which the User selects specific designated, approved and desired items, with distinction to the source, type or characteristics of those items; resulting in a Simultaneous one-step of moving all of the selected items into a single Virtual or Online Shopping Cart for purchase or acquisition; ordered and/or ordered and paid for then allocated for acquisition and fulfillment of all items Simultaneously from as many sources as necessary.

11 Claims, 4 Drawing Sheets

Figure 1:
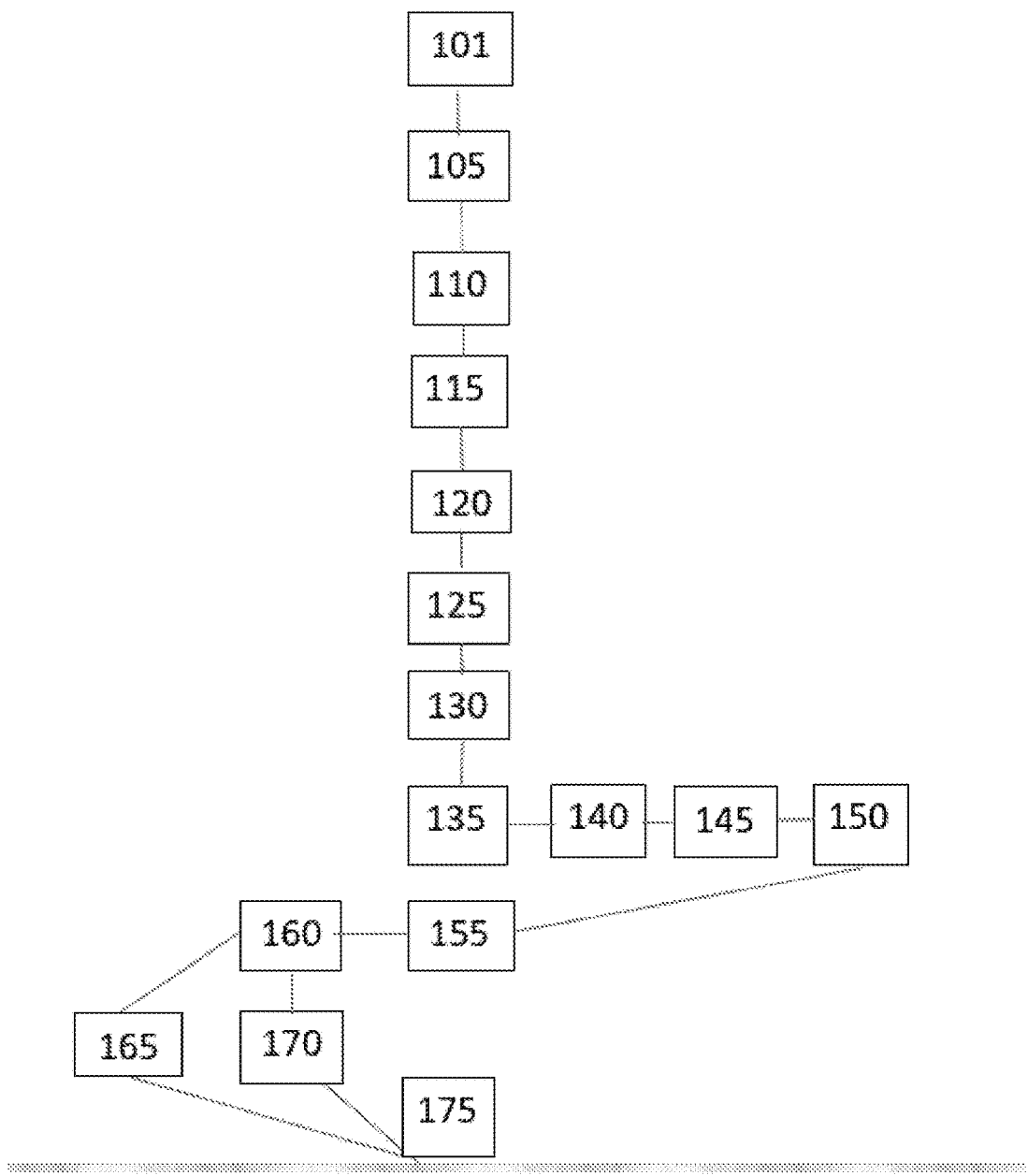

Related U.S. Application Data continuation-in-part of application No. PCT/US2013/027771, filed on Feb. 26, 2013.

(56) References Cited

U.S. PATENT DOCUMENTS

| | | | |
|---|---|---|---|
| 9,874,453 B2* | 1/2018 | Saraswat | G06Q 10/047 |
| 2002/0010637 A1* | 1/2002 | Lieu | G06Q 30/02 |
| | | | 705/26.1 |
| 2003/0018536 A1* | 1/2003 | Eggebraaten | G06Q 30/06 |
| | | | 705/26.81 |
| 2005/0021366 A1* | 1/2005 | Pool | G06F 17/2827 |
| | | | 705/26.1 |
| 2005/0177448 A1* | 8/2005 | Fu | G06Q 30/04 |
| | | | 705/26.2 |
| 2006/0059062 A1* | 3/2006 | Wood | G06Q 30/0603 |
| | | | 705/35 |
| 2009/0171683 A1* | 7/2009 | Hoyos | G06Q 20/12 |
| | | | 705/346 |

* cited by examiner

METHOD FOR SIMULTANEOUSLY ONE-STEP FILLING A VIRTUAL SHOPPING CART WITH MANY ITEMS FROM ONE OR MULTIPLE RESOURCES; ALL ITEMS OF ANY TYPE OR CHARACTERISTICS FROM POTENTIAL RESOURCES WHICH HAVE BEEN EMBODIED INTO A CUSTOMIZED LIST WHICH HAS BEEN SIMULTANEOUSLY GENERATED AND SOURCED IN ONE-STEP THEN PRESENTED VISUALLY TO USER TO SELECT ITEMS; CULMINATING AND RESULTING ACQUISITION TO BE SIMULTANEOSLY PLACED IN A SINGLE VIRTUAL SHPPING CART AND ALL ARE ACQUIRED SIMULTANEOUSLY FROM MANY SOURCE

CROSS REFERENCE

The present invention is a continuation-in-part of United States non-provisional patent application number U.S. Ser. No. 13/776,695 filed on Feb. 25, 2013 and takes priority to and the benefit of application number U.S. Ser. No. 13/776,695 filed on Feb. 25, 2013 and PCT number PCT/US2013/027771, and national phase applications numbers:

PCT/US2013/027771; National Phase in Australia, Canada, China, Europe, India and South Korea;

European Patent Application No. 13875448.6;

Application Number: EP 13 87 5448;

Canada—Canadian application 2905630

The Chinese application Serial number is 201380074918.4

South Korea—APPLICATION SERIAL N°: 2015-7025930

India—National Phase Patent Application No.: 2720/MUMNP/2015; APPLICATION SERIAL N°: 2720/MUMNP/2015

AUSTRALIA: APPLICATION SERIAL N°: 2013378760—AUTOMATICALLY FILLING A VIRTUAL OR ONLINE SHOPPING CART (national phase of PCT/US2013/027771)—Standard Patent Application 2013378760 in Australia in the name of HIRSCH, Andrea. Application Ser. No. 13/776,695 and all associated PCT national and international phase applications including those listed above are incorporated herein in their respective entirety's. The application numbers which appear on the IDS form in application Ser. No. 13/776,695 are disclosed herein and the application and publication numbers disclosed in any of the foreign applications and PCT exams are herein disclosed all by this reference.

I. FIELD OF THE INVENTION

The present invention relates to a method of Simultaneously filling a Virtual or Online Shopping Cart with a Customized List of All Items desired, approved, and selected by a User in a single one-step. The method allows Users to Simultaneously fill their Virtual or Online Shopping Cart(s) with a Customized List of All Items and components that are required or recommended to create or complete a project(s) or product(s).

The product(s) or project(s) may be comprised of, but not limited to, at least one of the following: kit(s), recipe(s), craft(s), project(s), craft project(s), art project(s), home improvement project(s), construction project(s), scientific project(s), apparel or fashion idea(s), creation(s), design(s), outfit(s), fashion design(s), project(s), or improvement project(s).

The method allows Users to Simultaneously fill their Virtual or Online Shopping Cart(s) with User desired, approved and selected items, from a Customized List of All Items which has been created Simultaneously in one-step from a User requested virtual search.

The method also allows Users to use a Customized List of All Items and then Simultaneously fill their Virtual or Online Shopping Cart(s) with the Customized List of All Items desired, approved, and selected by User in one-step. The items may be at least one of the following: components, stock keeping units, elements, segments, parts, and/or ingredients.

A method for Simultaneously in one-step filling a Virtual Shopping Cart with many items from one or multiple resources at one time; all items of any type from all potential resources are embodied into a Customized List of All Items, which has been Simultaneously generated and sourced from all potential resources in one-step and then presented visually to the User in a unique format from which the User selects specific designated, approved and desired items, with distinction to the source, type or characteristics of those items; resulting in a Simultaneous one-step of moving all of the selected items into a single Virtual or Online Shopping Cart for purchase or acquisition; ordered and/or ordered and paid for then allocated for acquisition and fulfillment of all items Simultaneously from as many sources as necessary.

It should be noted that while previously acquiring the items purchased included fulfillment of orders from the source/place User purchased from or its affiliated and/or contracted distributors or a combination thereof, the present invention allows for the User to acquire all items simultaneously from as many sources as necessary all at once whether the sources include the vendor that the User has ordered from, affiliated or contracted vendors or distributors, or not.

It also should be noted that in the present invention the User's initial request is for the sourcing and searching for a list of all items simultaneously not just one item or component at a time.

II. BACKGROUND OF INVENTION

Online shopping is currently popular. Ways of quickening, enhancing, improving, and adding to the process for consumers are of great interest. The current state of the art still requires in many areas that consumers have to go through several steps to find a target item and then continue a laborious process to locate other target items. Often consumers have to visit at least a few websites before they can find everything that they desire. Finding a seller that carries many or all of the items that the consumer needs can be difficult, and the consumer ends up spending extra time and/or money on purchasing all the items that they are looking for. In addition, comparisons of items with regard to a variety of variables such as price, brand, availability, and shipping cost are limited for consumers.

Various methods of simplifying, enhancing, and speeding up online shopping and expediting the process for consumers are known in the field. For example, a system and method for electronic commerce, which analyzes the products that individual purchases, and then generates a personalized electronic catalogue based on the User's purchase history, prior selections, and recent trends. Other examples include a method which assesses the needs of a User and generates the need of the User and displays a solution, and a system, which records, stores, and delivers data to a User after a label is scanned. The above examples disclose simplified ways of on-line shopping for Users based on personal interests, needs, and search terms.

The present invention integrates many areas of current interest for improvements in the field and is comprised of many new and innovative features which enhance, and improve upon the current state of the art. For example, the present invention allows consumers to enjoy an expedited shopping process by the present invention allowing for the User to find all the items they need based on an initial list of items required or recommended to create or produce a project(s) an/or product(s). The prior art does not disclose a single one-step to create a first Customized List of All Items from many sources which has been Simultaneously generated and sourced from all potential sources in one step. The first Customized List of All Items is presented visually to the User in a unique format from which the User selects specific designated, approved and desired items, and culminates and results in the execution of the final one-step moving all items that have been selected for purchase or acquisition Simultaneously, without distinction to the source, type or characteristics of the items, to be Simultaneously placed in a Virtual Shopping Cart.

In the prior art, a User still must individually select and add to their Virtual or On-line Shopping Cart, items that they want to purchase from one source and only one type of item at a time. The present invention saves time and steps. Also, it saves money and eliminants waste.

III. SUMMARY OF THE INVENTION

The present invention enables Users to enjoy greater convenience, speed, accuracy, choice, and simplicity when shopping on-line with by quickening, enhancing, improving, and adding to the Virtual shopping process for Users.

OVERVIEW

This overview focuses on key features of the present invention:

The User is searching for a list of all items simultaneously not just a single item or component separately at one time.

The User has the ability to Simultaneously buy/purchase/acquire multiple types of items, from one or multiple vendors/resources generated from a unique process resulting in a first Customized List of All Items of any type from all potential sources in one step which then is presented visually to the User in a unique format from which the User selects specific designated, approved and desired items, culminating and resulting in the execution of a final one-step, moving all items selected for purchase or acquisition, without it having to be from a single source, or single type of item, to be Simultaneously placed in a Virtual Shopping Cart by a final single one-step/one-entry/one-keystroke. The present invention allows a User to fill a Virtual Shopping Cart, with an assortment of as many different items as is desired, approved and selected by the User to be acquired/purchased from as many different websites, sources, or locations as is required in one-step or one-entry or one-keystroke utilizing a User smart device which is running a specific unique software application operated by the User.

A method for Simultaneously in one-step filling a Virtual Shopping Cart with many items from one or multiple resources at one time; all items of any type from all potential resources are embodied into a Customized List of All Items, which has been Simultaneously generated and sourced from all potential resources in one-step and then presented visually to the User in a unique format from which the User selects specific designated, approved and desired items, with distinction to the source, type or characteristics of those items; resulting in a Simultaneous one-step of moving all of the selected items into a single Virtual or Online Shopping Cart for purchase or acquisition; ordered and/or ordered and paid for then allocated for acquisition and fulfillment of all items Simultaneously from as many sources as necessary, comprised of the following steps:

1) Requesting the creation of a complete first Customized List of All specified items that are necessary, required, or requested components for User to purchase to complete at least one specific project, product, or task.
2) Searching one or many sources Simultaneously at one time to request and receive data for all the components or items needed and associated with a specific project, product, task in a single one-step.
3) Collecting and formatting the storage of the data and information at one time in one-step, for all components necessary, required, selected, or requested for a specific project, product, or task.
4) Presenting this Customized List of All Items visually in a unique on-screen presentation for User to elect selection(s) in any customized combination and approve the selected items for purchase.
5) Filling a Virtual or Online Shopping Cart in a single one-step one-entry, one stroke, or by moving the items from the Customized List of All Items selected by User to be purchased for a specific project, product, or task Simultaneously to one single Virtual or Online Shopping Cart in one single one-step.

This combination (1-5 immediately above) creates a unique process for quickly and efficiently collecting, storing, displaying, reviewing, and customizing by selecting and/or deselecting and/or adding components for acquisition and/or purchase in a single one-step move of all items for acquisition and/or purchase to a Virtual or Online Shopping Cart.

In the present invention, a User smart device communicates with at least one source which in many cases is at least one server, thus performing functions that did not exist in the pre-internet world, and cannot be practicably performed by a User in a reasonable timeframe, yet the User receives the benefit of machine to machine communication at machine speeds and reaps the benefit of a computer's organizational and reorganizational capability when the User interacts with a computer to make decisions and selections in real time.

In the present invention the User enters and requests the initial list of items for a project or product or a specific project or product and then computers identify and extract useful and desired information electronically stored in many possible locations Simultaneously at one time, assembles that information in at least one organized and uniquely formatted list, and visually presents this first Customized List of All Items to a User in a unique and easy to understand format so that User decisions can be made speedily and with efficiency, and further, that at least one Customized List of All Items can be reduced or expanded in size, new information from new sources can be electronically harvested by the computer under User guidance, and new lists can be generated so that, in the end, a final or modified final Customized List of All Items can be selected and approved by a User and all items of any type Simultaneously for purchase can be placed in a Virtual or Online Shopping Cart in one-step (i.e. one keystroke) by a User regardless of how many vendors from whom purchases were made.

The present invention allows for a large amount of data regarding a project(s) or product(s), including its parts or components or ingredients, and various additional data to be displayed in a unique visual format on-screen, on a computer and/or smart or mobile device. For a User to view such data and make decisions, data must be quickly viewed and understood by the User. The present invention displays large amounts of data in a clear visual manner which is interpreted speedily by a User on a smart device, allowing the User to efficiently and quickly customize selections for acquisition.

The present invention also provides for a reduction or the elimination of excessive clicking, and for critical information to be clearly and effectively displayed on a smart device. The useful compact displays are coupled with the flexibility of allowing the User to view and select and/or deselect to create new customized derivative lists. This combination creates a useful process for quickly collecting, storing, displaying, reviewing, selecting and/or deselecting components for purchase in a single one-step move of all items to a Virtual shopping cart.

The present invention provides for a specific series of all-inclusive one-steps, which is a departure from the routine and conventional way of selecting separate items (each one at a time) from groups of similar items and repeating that process until all types of selections are selected one by one in separate shopping cart selections. The present invention is an improvement to the existing selection method whereby the existing method requires excessive entering and selecting for each choice.

The present invention replaces many entries or selections with fewer entries or selections, or in some cases as few as one-step, one entry, and one selection. This useful display is coupled here with the flexibility of allowing a User to view and select and/or deselect.

This process is not limited to purchasing from a single vendor's shopping cart. It will Simultaneously fill a shopping cart from multiple vendors with one keystroke or step.

This combination creates a useful process for quickly displaying, reviewing, and selecting and/or deselecting parts and/or components for purchase culminating in a final one-step move to a Virtual cart of all items.

An important component regarding the present invention in comparison to the current use methods is that, while it may be theoretically possible to manually compute steps done by the computer, the steps are not practical or possible to complete given the constraint of deadline in the real world in which we live.

The present invention includes the collection, storing, presenting, customizing, reconfiguring of data including decisions made by a User which are presented in a visual display conducive to making new decisions and choices and having the data visually displayed in real time in a unique format, and this cannot be done by a person in a supermarket.

The present invention can be applied to any industry.

The present invention in at least one embodiment is a method for Simultaneously in one-step filling a Virtual Shopping Cart with many items from one or multiple resources at one time; all items of any type from all potential resources are embodied into a Customized List of All Items, which has been Simultaneously generated and sourced from all potential resources in one-step and then presented visually to the User in a unique format from which the User selects specific designated, approved and desired items, with distinction to the source, type or characteristics of those items; resulting in a Simultaneous one-step of moving all of the selected items into a single Virtual or Online Shopping Cart for purchase or acquisition; ordered and/or ordered and paid for then allocated for acquisition and fulfillment of all items Simultaneously from as many sources as necessary, comprised of the following steps: A. 1) initiating the method by: initiating and running a specific software application on a User smart device, operated by at least one User; or downloading, and/or sign-in and/or registering process, initiating and running a specific software application on a User smart device, operated by at least one User, ii) searching Simultaneously in one-step for all items or components and associated information by: a) entering, scanning, submitting, or inputting of an initial list of items for a project(s) or product(s) or entering, scanning, submitting, or inputting of an initial project(s) or product(s) request by User; b) performing said search by the following: requesting a Simultaneous search for purchase and/or acquisition of all the items or components needed to complete the specific project or product request by User, and searching for multiple vendors Simultaneously; and performing a search and communicating virtually with at least one source to request and receive the results of the User's said search request utilizing a unique process to create a first Customized List of All Items requested; performing the following: 1. storing search results in at least one database; 2. accessing at least one data base or accessing and updating said at least one database; 3. retrieving the results of User's request for project or product information to be presented visually to the User in a unique format in the form of a first Customized List of All Items;

B. Visually displaying said first Customized List of All Items and information of all items: storing said first Customized List of All Items in a unique format on said User smart device or said server for presentation in a unique visual format to said User;

C. User selecting the desired Customized List of All Items: i) modifying said first Customized List of All Items derived from said unique process presented visually to User in a unique format allowing for the User's customization, selection and approval; ii) applying User's constraints to said Customized List of All Items by User utilizing said User smart device running said specific and unique software process; iii) storing said modified Customized List of All Items in a unique format for visual presentation to said User in order for User to make a desired and approved selection;

D. adding a complete final or modified final Customized List of All Items of any types and from any sources Simultaneously to a Virtual or Online Shopping Cart in one-step; Simultaneously in one-step filling a Virtual or Online Shopping Cart by the implementation of one of the following steps by said User: a) Simultaneously in a single one-step moving the said final Customized List of All Items to the checkout or purchase process as follows: Simultaneously in a single one-step moving all the said Users' desired and approved items from a final Customized List of All Items to a Virtual or Online Shopping Cart utilizing said User's smart device running said specific unique software; or b) the generating of a new modified final Customized List of All Items by the steps of: generating said new modified Customized List of All Items by said User's reselection of desired and approved items any number of times by implementing any number of the above steps until said User creates said a desired and approved modified final Customized List of All Items for purchase and/or acquisition; and Simultaneously in a single one-step moving all items from said final or modified final Customized List of All Items to a Virtual or Online Shopping Cart said User smart device running said specific software application; E. Acquiring and fulfilling all items as follows: taking all the items that are within the final or modified final customized list of all items that has been moved simultaneously in a single one-step to a single virtual or online shopping cart ordered and/or ordered and paid for and allocating them for acquisition and fulfillment simultaneously from as many sources as necessary all at once.

In the present invention:

the search may include searching from the seller(s) information that has already been stored in the said at least one database;

the User operated device can be at least one of the following devices: computers, smart phones, tablets, mobile devices, and/or any electronic devices with internet or other Virtual or wireless network capabilities;

Simultaneously searching for and then displaying all of the required items in a Customized List of All Items includes any and all substitute items that have been located when items are out of stock or unavailable; the item(s) in the User desired, approved and selected final Customized List of All Items can be stored to be included in any new search(es) for other projects, products, kits, recipes, or crafts that require in part or in whole;

the type of items may include supplies, components, elements, compounds, segments, parts, and/or ingredients;

the User in at least one embodiment may select an additional or foreign language.

the type of information gathered may include price, brand, quantity, description, quality, seller(s) of the items, shipping cost, shipping method, volume, weight, measurement, delivery time, availability, vendor, brand, manufacturer, retailer, distributor, and/or size;

in at least one embodiment the price, if present, may be converted to and displayed in a User selected equivalent foreign currency, foreign measurement, measurements, metric or SAE measurement;

the User may be provided with an option to remove items before the items are put in the shopping cart or remove items after they have been placed in the shopping cart;

the User may be provided with an option to remove items before the items are placed in the shopping cart by allowing deselection of any item(s);

in at least one embodiment there can be automatic recognition of desired and approved User selected items that the User had previously purchased and adjusting items to be added into the shopping cart;

in at least one embodiment there is identification of items being sold by sellers, distributors, retailers, manufacturers, and/or vendors;

additional information may be available on outfits, accessories, headwear, clothing, footwear, outerwear, apparel or fashion idea, creation, or design and the items needed can be adjusted based on a User's various measurements;

a step of calculating discounts for group shipping of items from at least one of: seller(s), distributor, retailer, manufacturer, or vendor;

initial lists entered, input, scanned, read from or otherwise coming from the User and/or virtual sourced lists or any requested or required items or components and/or associated information in whole or in part may be obtained or collected from sources such as QR codes, 2D barcodes, 1D barcodes, UPC Codes, MVS Mobile Visual Search, Linear barcodes, barcodes, International Standard Book Number ISBN codes, words, characters, photographs, drawings, images, spoken words, music, sounds, smells and/or may be available in whole or in part in various locations including but not limited to comprising of at least one of the following: written or printed materials, product boxes, packaging, labels, books, audio books, point-of-sale materials, recipes, magazines, ads, websites, internet locations, newspapers, products, items, sounds, photographs, images;

a User devise can be mobile device, camera, device, scanner, smart device, computer, device, or electronic device;

a recipe, product, project, items needed for the recipe can be adjusted based on at least one of the following criteria comprising: brand, quality, price, seller, vendor, retailer, distributor, shipping costs, measurement, quantity, availability, size, weight, measurement, volume, portion size, and serving size;

in at least one embodiment a constraint is at least one of: time needed to complete a project, or manufacture or make at least one product, cost or price, brand, age or age group, size, quantity or quantity in stock, item or component description or information, quality, User rating, at least one substitute or at least one similar item, shipping cost, shipping method, shipping options, space and/or volume, area, at least one length or dimension or measurement, delivery date or time, availability, calories, mass, weight, density, at least one restricted substance, personal preference; in at least one embodiment information, words or language created and displayed on any device are translated and displayed in at least one User selected additional or foreign language; in at least one embodiment price is converted to and displayed in a User selected equivalent foreign currency;

at least one embodiment may include recognition of relevant, similar, or previous purchases made by said User and adding currently available previously purchased items to at least one Customized List of All Items and displaying said Customized List of All Items for selection or deselection by said User;

in at least one embodiment there can be calculation of discounts, or discounts for group shipping of items from at least one of seller, distributor, retailer, manufacturer, or vendor;

a source can be any of: including but not limited to written or printed material such as a magazine, newspaper, data sheet, poster, pamphlet, book, point-of-sale material, advertisement, electronic display, television display, computer display, monitor, a product, an item, a label, a recipe, a product box or box, bag, other product packaging and type of goods, products, byproducts, and/or services.

The present invention in at least one embodiment is an internet based system for providing Users, upon entering their request, with a Simultaneously populated Customized List of All Items in a single one-step, from which the User may select and customize and then place into a single Virtual or Online Shopping Cart also in a single one-step; said internet based system comprising of a method for Simultaneously in one-step filling a Virtual Shopping Cart with many items from one or multiple resources at one time; all items of any type from all potential sources, which are embodied in a Customized List of All Items which has been Simultaneously generated and sourced from all potential sources in one-step and then presented visually to the User in a unique format from which the user selects specific designated, approved and desired items, and culminating and resulting in the execution of the final one-step, moving all the items selected for purchase or acquisition without distinction to the source, type or characteristics of the items to be Simultaneously placed in a single Virtual or Online Shopping Cart; ordered and/or ordered and paid for then allocating the acquisition and fulfillment of all items Simultaneously from as many sources as necessary; and more efficiently than all items having to be acquired through multiple shopping carts and/or multiple singular transactions one at a time, comprised of the following steps:

A. initiating the system by: initiating and running of a specific software application on a User smart device, operated by at least one User; or downloading, registering for sign-in process, initiating and running of a specific software application on a User smart device, operated by at least one User; or B. searching for all items or components and associated information in one-step by first: Entering, scanning, submitting, or inputting of an initial list of items for a project(s) or product(s) or entering, scanning, submitting, or inputting of an initial project(s) or product(s) request by User; and a) performing said search by the following: requesting a Simultaneous search for purchase and/or acquisition of all the items or components needed to complete the specific project or product request by User, and searching for multiple vendors Simultaneously; and performing a search and communicating virtually with at least one source to request and receive the results of the User's said search request utilizing a unique process to create a first Customized List of All Items requested; performing of at least one of the following by said at least one source utilizing at least one data base: 1. performing at least one search engine function, storing search results in said at least one data base; 2. accessing at least one data base or accessing and updating said at least one database; 3. accessing said at least one data base, updating said at least one data base, enabling said User smart device to access and receive data, in whole or in part, from said at least one data base, containing data and associated information about at least one component or item of the said data and associated information in said at least one data base; reading or retrieving of code, data, and/or associated information from said at least one source or said at least one data base by said User smart device operated by said User; translating said code and/or information into instructions and product information causing said creation of a unique process presented as a first Customized List of All Items requested for a specific project(s) or Product(s) including items for acquisition and/or purchase and associated information and translating including: decoding from within said code itself or from any project or product list and/or information that has been included within or transferred from said at least one source, and retrieving project or product information for said creation of a unique process presented as a first Customized List of All Items which is embodied, in whole or in part, within or on said at least one source, and/or said data base, and/or said User smart device and/or said specific software application; he causing of said creation of a unique process results in and being presented as a first Customized List of All Items to be stored in User smart device and/or in a data base causing said creation of a unique process presented as a first Customized List of All Items: wherein if all of the data fields are filled in completely then no additional search is required, and if said at least one specific data field is not filled in completely then said second Customized List of All Items contains at least one component causing User smart device to communicate with said at least one source to create at least one inquiry generated from said second Customized List of All Items to be received by said at least one source performing at least one search engine function to collect data necessary to fill in said at least one specific data field and Amalgamating consolidation uniting the data to generate a first Customized List of All Items; Repeating the above steps until the first Customized List is complete with all items or all available items; 4. retrieving the results of User's request for a Customized List of All Items for a project or product to be presented visually to the User in a unique format in the form of a first Customized List of All Items;

C. Visually displaying said first Customized List of All Items and information of all items: storing said first Customized List of All Items in a unique format on said User smart device or said server for presentation in a unique visual format to said User;

D. User selecting the desired Customized List of All Items: i) modifying said first Customized List of All Items derived from said unique process presented visually to User in a unique format allowing for the User's customization, selection and approval; ii) applying User's constraints to said Customized List of All Items by User utilizing said User smart device running said specific and unique software process; iii) storing said modified Customized List of All Items in a unique format for visual presentation to said User in order for User to make a desired and approved selection;

E. Adding a complete final Customized List of All Items of any types and from any sources Simultaneously to a single Virtual or Online Shopping Cart in one-step;

ii) Simultaneously in one-step filling a Virtual or Online Shopping Cart by the implementation of one of the following steps by said User: a) Simultaneously in a single one-step moving the said final Customized List of All Items to the checkout or purchase process as follows: Simultaneously in a single one-step moving all the said Users' desired and approved items from a final Customized List of All Items to a Virtual or Online Shopping Cart utilizing said User's smart device running said specific unique software; or b) the generating of a new modified final Customized List of All Items by the steps of: generating said new modified Customized List of All Items by said User's reselection of desired and approved items any number of times by implementing any number of the above steps until said User creates said a desired and approved modified final Customized List of All Items for purchase and/or acquisition; and Simultaneously in a single one-step moving all items from said final or modified final Customized List of All Items to a Virtual or Online Shopping Cart said User smart device running said specific software application;

F. Acquiring and fulfilling all items as follows: taking all the items that are within the final customized list of all items or the modified final customized list of all items that has been moved simultaneously in a single one-step to a single virtual or online shopping cart and allocating them to where we will be acquiring them and acquiring all items simultaneously from as many sources as necessary all at once.

The present invention in the above embodiment may include any of the following:

in at least one embodiment a constraint is at least one of: time needed to complete a project, or manufacture or make at least one product, cost or price, brand, age or age group, size, quantity or quantity in stock, item or component description or information, quality, User rating, at least one substitute or at least one similar item, shipping cost, shipping method, shipping options, space and/or volume, area, at least one length or dimension or measurement, delivery date or time, availability, calories, mass, weight, density, at least one restricted substance, personal preference;

a specific software application can be in part or in whole a mobile application; in at least one embodiment information, words or language created and displayed on any device are translated and displayed in at least one User selected additional or foreign language;

in at least one embodiment price is converted to and displayed in a User selected equivalent foreign currency;

at least one embodiment may include recognition of relevant, similar, or previous purchases made by said User and adding currently available previously purchased items to at least one Customized List of All Items and displaying said Customized List of All Items for selection or deselection by said User;

in at least one embodiment there can be calculation of discounts, or discounts for group shipping of items from at least one of seller, distributor, retailer, manufacturer, or vendor, a source can be any of: including but not limited to written or printed material such as a magazine, newspaper, data sheet, poster, pamphlet, book, point-of-sale material, advertisement, electronic display, television display, computer display, monitor, a product, an item, a label, a recipe, a product box or box, bag, other product packaging, a person, place, or thing, or image of a person, place, or thing, website, or any other source of visual material or an electronic source including but not limited to typing of keys, acoustic input such as speech or sound or music, audio, book, electromagnetic which can be wireless or via at least one wire, optical or fiber optic signals, at least one conductive touch code that can contain at least one conductive region that communicates directly with a touch screen, or other means now known or unknown;

In at least one embodiment the present invention is a system providing for one-step filling of a Virtual or Online Shopping Cart with all selections selected for purchase by a User from a Customized List of All Items that are associated with, related to, or required for a project, comprising:

a computer utilizing software programs to receive, store and group data for a plurality of projects, wherein said data for said plurality of projects, comprises at least one project's information or component information;

said computer receiving at least one of User input, User query or User preference(s), wherein said User input, User query or User preference(s) comprises at least one project information query, or at least one component information query;

said computer utilizing said software programs, stored data, or live information search or query to generate at least one of, a resultant, substitute, new, or alternative Customized List of All Items of at least one project or product or item or component required or associated with or related to at least one project based on said query: said computer producing and visually displaying a Customized List of All Items of products or projects or items or components based on User preference(s) and User selections;

said computer adding or subtracting from said Customized List of All Items based on at least one selection or deselection by said User from said Customized List of All Items of selections, forming a new list, that is then visually presented on-screen to User for User to add to a Virtual or Online Shopping Cart all at the same time in one-step; and said computer placing a final refined Customized List of All Items of all items for purchase for a project into a Virtual or Online Shopping Cart in one-step because of a one selection or one entry, or one keystroke command by said User.

In at least one embodiment the User operated device is: a User smart device, a computer, a smart phone, a tablet, a mobile device, or any electronic device with internet, or a Virtual or wireless or wired network capability;

In at least one embodiment the present invention is an internet based system for providing Users with a Simultaneously generated and sourced Customized List of All Items from all potential sources in a single one-step, and then presented visually to the User in a unique format from which the User selects specific designated, approved and desired items, and culminating and resulting in the execution of the final one-step, moving all the items selected for purchase or acquisition without distinction to the source, type or characteristics of the items to be Simultaneously placed in a Virtual or Online Shopping Cart which they may select or customize prior to placing in a Virtual or Online Shopping Cart in a single one-step, the internet based system comprising:

a. At least one database on or available to at least one host server storing information describing a plurality of lists or groups of items, the database further comprising:
   1. A means to manually enter lists or groups of items associated with a project or product;
   2. A means to Simultaneously input lists or groups of items associated with a Customized List of All Items;
   3. A means to search for at least one online seller selling items associated with a Customized List(s) of All Items;

b. Providing at least one database and at least one host server, which can communicate with a plurality of User operated devices, electronic devices or mobile devices; the host server further comprising:
   1. A means to Simultaneously formulate a list or group of items when a query or request about Customized List of All Items or a project or a product is made on the User's operated electronic or mobile device;
   2. A means to Simultaneously search for each item and information about each item in a list or group of items;
   3. A means to Simultaneously display visually the list group of items and information about each item on the User operated device;
   4. A means to receive and process an order containing a User's selection of the group of items when submitted in a single one-step by the User.

The features of the present invention are novel which are expressly set forth in the specification. The present invention now will be described more fully hereinafter with reference to the accompanying drawings, which are intended to be read in conjunction with both this summary, the detailed description and any preferred and/or embodiments specifically discussed or otherwise disclosed. The present invention may, however, be embodied in many different forms and should not be construed as limited to the embodiments set forth herein; rather, these embodiments are provided by way of illustration only and so that this disclosure will be thorough, complete and will fully convey the full scope of the present invention to those skilled in the art.

The following descriptions of specific embodiments of the present invention are set forth in the brief and detailed descriptions of the drawings and description of preferred embodiment and have been presented for purposes of illustration and description. However, said descriptions are not intended to be exhaustive or to limit the present invention to the precise forms disclosed, and obviously many modifications and variations are possible considering the above teaching. The exemplary embodiment(s) were chosen and described in order to best explain the principles of the present invention and its practical application, to thereby enable others skilled in the art to best utilize the present invention and various embodiments with various modifications as are suited to the particular use contemplated.

IV. DESCRIPTION OF A PREFERRED EMBODIMENT

The present invention in at least one embodiment is a method for Simultaneously in one-step filling a Virtual Shopping Cart with many items from one or multiple resources at one time; all items of any type from all potential sources, which are embodied in a Customized List of All Items which has been Simultaneously generated and sourced from all potential sources in one-step and then presented visually to the User in a unique format from which the user selects specific designated, approved and desired items, and culminating and resulting in the execution of the final one-step, moving all the items selected for purchase or acquisition without distinction to the source, type or characteristics of the items to be Simultaneously placed in a single Virtual or Online Shopping Cart; ordered and/or ordered and paid for then allocating the acquisition and fulfillment of all items Simultaneously from as many sources as necessary; and more efficiently than all items having to be acquired through multiple shopping carts and/or multiple singular transactions one at a time, comprised of the following steps: A. i) initiating the method by: initiating and running a specific software application on a User smart device, operated by at least one User; or downloading, and/or sign-in and/or registering process, initiating and running a specific software application on a User smart device, operated by at least one User; ii) searching Simultaneously in one-step for all items or components and associated information by: a) entering, scanning, submitting, or inputting of an initial list of items for a project(s) or product(s) or entering, scanning, submitting, or inputting of an initial project(s) or product(s) request by User, b) performing said search by the following: requesting a Simultaneous search for purchase and/or acquisition of all the items or components needed to complete the specific project or product request by User, and searching for multiple vendors Simultaneously; and performing a search and communicating virtually with at least one source to request and receive the results of the User's said search request utilizing a unique process to create a first Customized List of All Items requested; performing the following: 1. storing search results in at least one database; 2. accessing at least one data base or accessing and updating said at least one database; 3. retrieving the results of User's request for project or product information to be presented visually to the User in a unique format in the form of a first Customized List of All Items; B. Visually displaying said first Customized List of All Items and information of all items: storing said first Customized List of All Items in a unique format on said User smart device or said server for presentation in a unique visual format to said User; C. User selecting the desired Customized List of All Items: i) modifying said first Customized List of All Items derived from said unique process presented visually to User in a unique format allowing for the User's customization, selection and approval; ii) applying User's constraints to said Customized List of All Items by User utilizing said User smart device running said specific and unique software process; iii) storing said modified Customized List of All Items in a unique format for visual presentation to said User in order for User to make a desired and approved selection; D. adding a complete final or modified final Customized List of All Items of any types and from any sources Simultaneously to a Virtual or Online Shopping Cart in one-step; Simultaneously in one-step filling a Virtual or Online Shopping Cart by the implementation of one of the following steps by said User: a) Simultaneously in a single one-step moving the said final Customized List of All Items to the checkout or purchase process as follows: Simultaneously in a single one-step moving all the said Users' desired and approved items from a final Customized List of All Items to a Virtual or Online Shopping Cart utilizing said User's smart device running said specific unique software; or b) the generating of a new modified final Customized List of All Items by the steps of: generating said new modified Customized List of All Items by said User's reselection of desired and approved items any number of times by implementing any number of the above steps until said User creates said a desired and approved modified final Customized List of All Items for purchase and/or acquisition; and Simultaneously in a single one-step moving all items from said final or modified final Customized List of All Items to a Virtual or Online Shopping Cart said User smart device running said specific software application; E. Acquiring and fulfilling all items as follows: taking all the items that are within the final or modified final customized list of all items that has been moved simultaneously in a single one-step to a single virtual or online shopping cart ordered and/or ordered and paid for and allocating them for acquisition and fulfillment simultaneously from as many sources as necessary all at once.

In the present invention:

the search may include searching from the seller(s) information that has already been stored in the said at least one database;

the User operated device can be at least one of the following devices: computers, smart phones, tablets, mobile devices, and/or any electronic devices with internet or other Virtual or wireless network capabilities;

Simultaneously searching for and then displaying all of the required items in a Customized List of All Items includes any and all substitute items that have been located when items are out of stock or unavailable;

the item(s) in the User desired, approved and selected final Customized List of All Items can be stored to be included in any new search(s) for other projects, products, kits, recipes, or crafts that require in part or in whole these same item(s);

the type of items may include supplies, components, elements, compounds, segments, parts, and/or ingredients;

the User in at least one embodiment may select an additional or foreign language.

the type of information gathered may include price, brand, quantity, description, quality, seller(s) of the items, shipping cost, shipping method, volume, weight, measurement, delivery time, availability, vendor, brand, manufacturer, retailer, distributor, and/or size;

in at least one embodiment the price, if present, may be converted to and displayed in a User selected equivalent foreign currency, foreign measurement, measurements, metric or SAE measurement;

the User may be provided with an option to remove items before the items are put in the shopping cart or remove items after they have been placed in the shopping cart;

the User may be provided with an option to remove items before the items are placed in the shopping cart by allowing deselection of any item(s);

in at least one embodiment there can be automatic recognition of desired and approved User selected items that the User had previously purchased and adjusting items to be added into the shopping cart;

in at least one embodiment there is identification of items being sold by sellers, distributors, retailers, manufacturers, and/or vendors;

additional information may be available on outfits, accessories, headwear, clothing, footwear, outerwear, apparel or fashion idea, creation, or design and the items needed can be adjusted based on a User's various measurements;

a step of calculating discounts for group shipping of items from at least one of: seller(s), distributor, retailer, manufacturer, or vendor;

initial lists entered, input, scanned, read from or otherwise coming from the User and/or virtual sourced lists or any requested or required items or components and/or associated information in whole or in part may be obtained or collected from sources such as QR codes, 2D barcodes, 1D barcodes, UPC Codes, MVS Mobile Visual Search, Linear barcodes, barcodes, International Standard Book Number ISBN codes, words, characters, photographs, drawings, images, spoken words, music, sounds, smells and/or may be available in whole or in part in various locations including but not limited to comprising of at least one of the following: written or printed materials, product boxes, packaging, labels, books, audio books, point-of-sale materials, recipes, magazines, ads, websites, internet locations, newspapers, products, items, sounds, photographs, images;

a User devise can be mobile device, camera, device, scanner, smart device, computer, device, or electronic device;

a recipe, product, project, items needed for the recipe can be adjusted based on at least one of the following criteria comprising: brand, quality, price, seller, vendor, retailer, distributor, shipping costs, measurement, quantity, availability, size, weight, measurement, volume, portion size, and serving size;

in at least one embodiment a constraint is at least one of: time needed to complete a project, or manufacture or make at least one product, cost or price, brand, age or age group, size, quantity or quantity in stock, item or component description or information, quality, User rating, at least one substitute or at least one similar item, shipping cost, shipping method, shipping options, space and/or volume, area, at least one length or dimension or measurement, delivery date or time, availability, calories, mass, weight, density, at least one restricted substance, personal preference; in at least one embodiment information, words or language created and displayed on any device are translated and displayed in at least one User selected additional or foreign language; in at least one embodiment price is converted to and displayed in a User selected equivalent foreign currency;

at least one embodiment may include recognition of relevant, similar, or previous purchases made by said User and adding currently available previously purchased items to at least one Customized List of All Items and displaying said Customized List of All Items for selection or deselection by said User;

in at least one embodiment there can be calculation of discounts, or discounts for group shipping of items from at least one of seller, distributor, retailer, manufacturer, or vendor.

VII. BRIEF DESCRIPTION OF DRAWINGS

The following description of at least one current preferred embodiment of the present invention has been presented for the purposes of illustration and description.

Other embodiments of the present invention may become apparent to those skilled in the art from the below detailed description, (as well as the specification, and claims herein), which shows and describes illustrative embodiments of the present invention. As will be realized, the present invention can include of other modifications in order to facilitate the desired results of the present invention, all without departing from the spirit and scope of the present invention. Accordingly, the detailed description is to be regarded as illustrative in nature and not restrictive. Although not explicitly recited, one or more embodiments of the present invention may be practiced in combination or conjunction with one another.

The idea, creation, formulation and methodology of the present invention as "A method for Simultaneously in one-step filling a Virtual Shopping Cart with many items from one or multiple resources at one time; all items of any type from all potential resources are embodied into a Customized List of All Items, which has been Simultaneously generated and sourced from all potential resources in one-step and then presented visually to the User in a unique format from which the User selects specific designated, approved and desired items, with distinction to the source, type or characteristics of those items; resulting in a Simultaneous one-step of moving all of the selected items into a single Virtual or Online Shopping Cart for purchase or acquisition; ordered and/or ordered and paid for then allocated for acquisition and fulfillment of all items Simultaneously from as many sources as necessary"

all of which are examples of the intended utilization, but are not to be construed or interpreted to limit the scope of the present invention or its use. Furthermore, the reference or non-reference to an embodiment of the present invention shall not be interpreted to limit the scope the present invention. It is intended that the scope of the present invention not be limited by this detailed description or the specification.

FIG. 1—SEE DETAILED DESCRIPTION BELOW.

Figure 2:
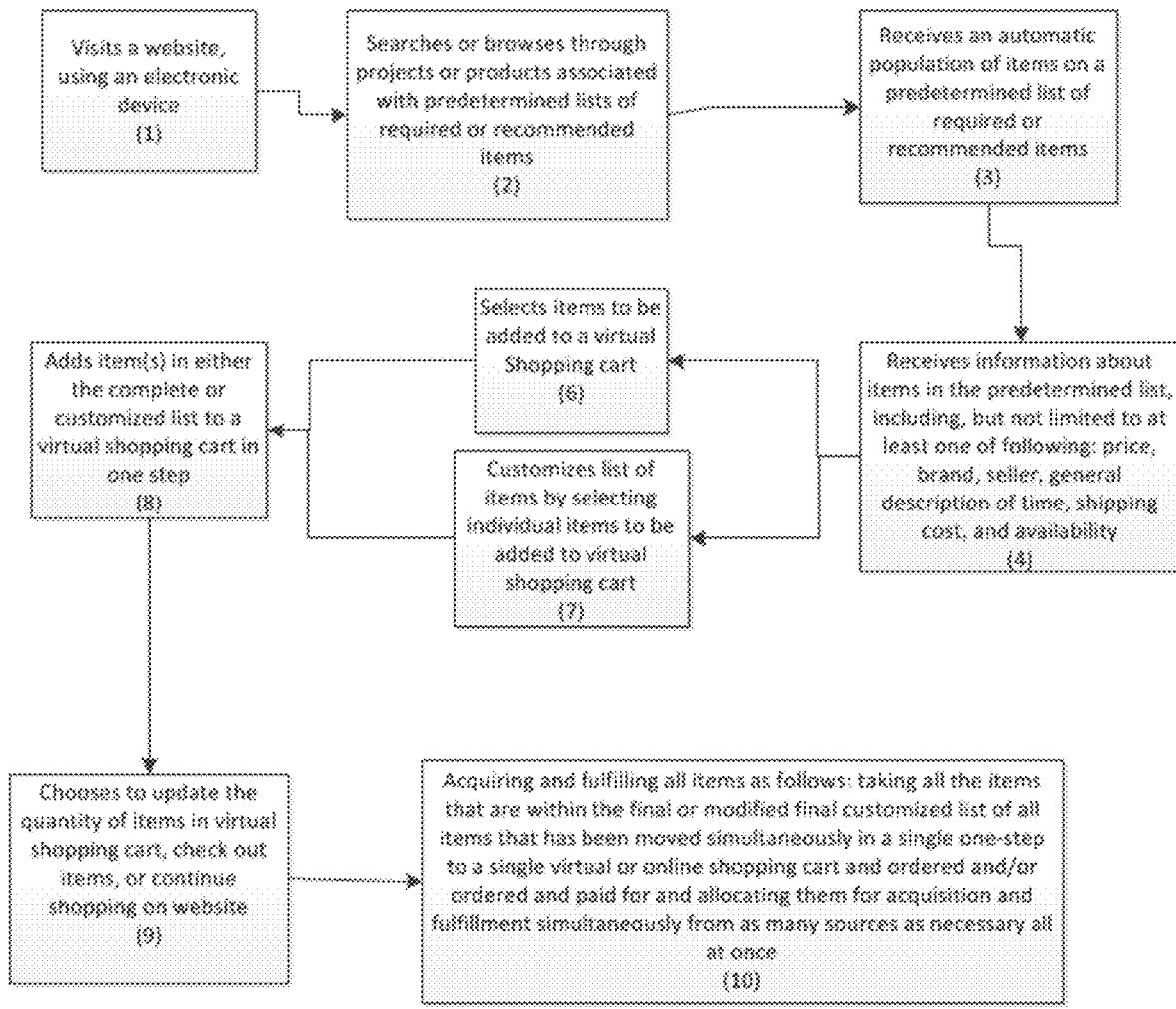

FIG. 2—depicts a flowchart showing the logical steps of the Method according to at least one embodiment of the present invention.

Figure 3:
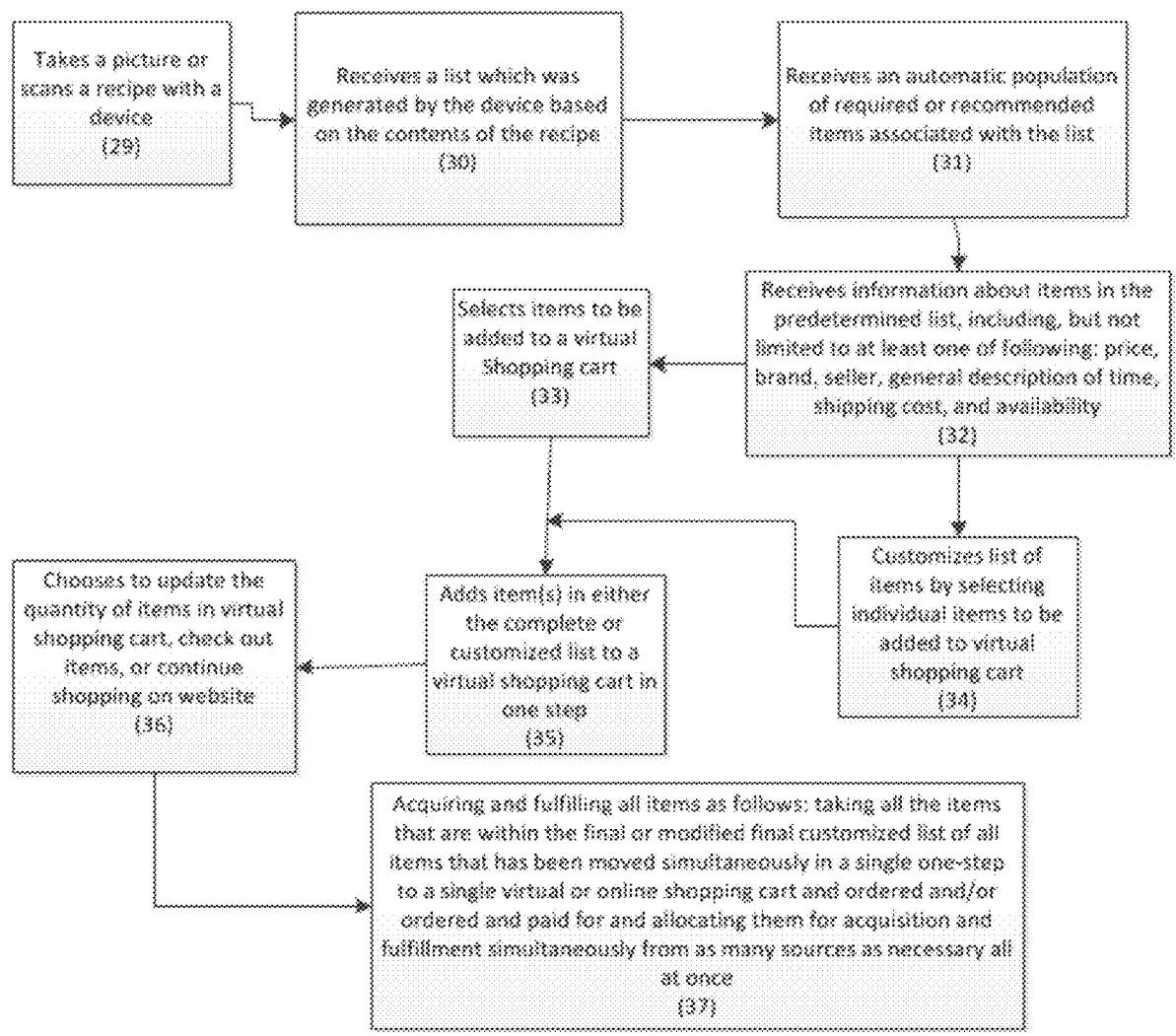

FIG. 3—shows the process of being able to photograph items, components, or material from a book utilizing at least one of a: smart device, computer, Mobile Device, mobile phone, or camera, optically scan the items and placing the scanned information into a shopping list, that can be virtually shopped.

Figure 4:
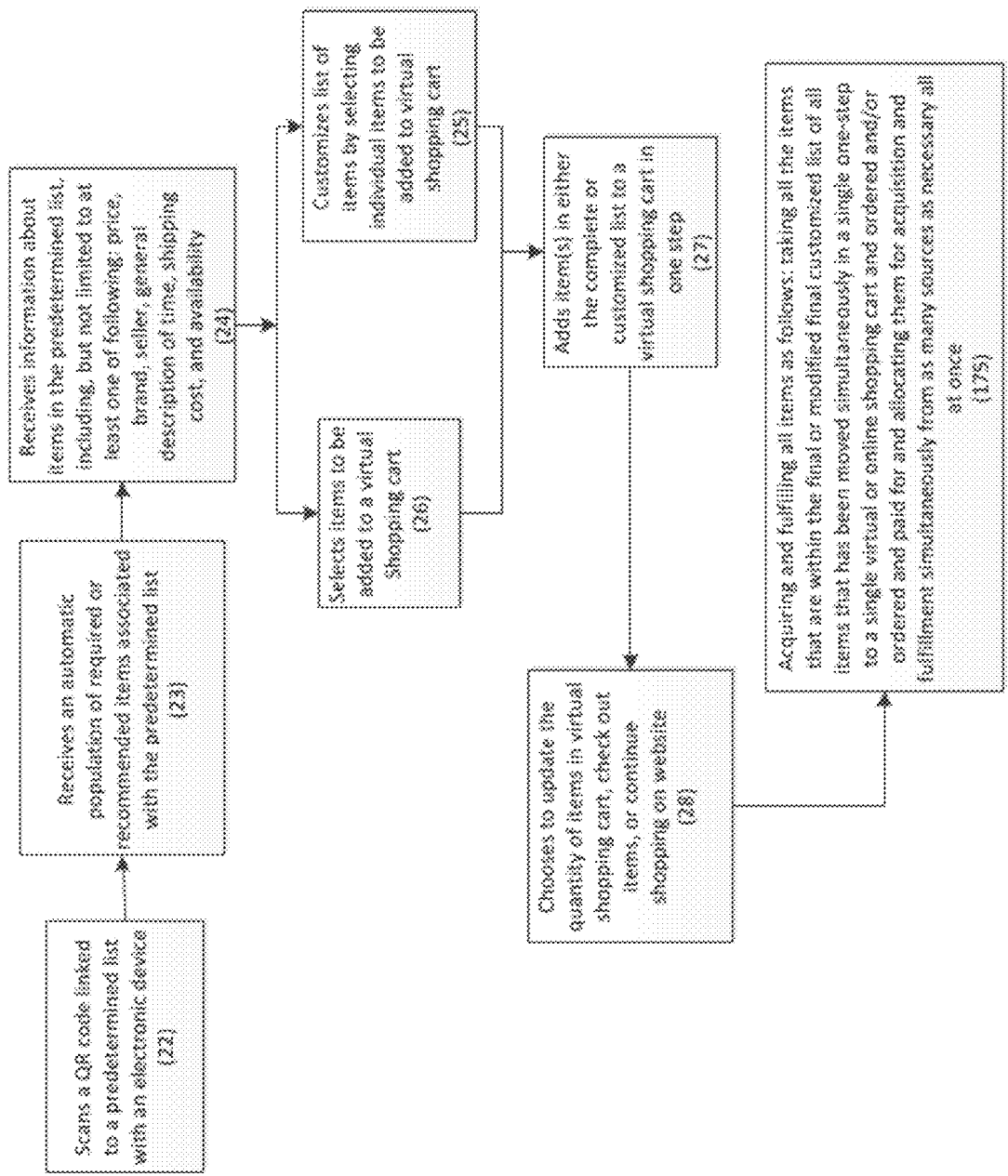

FIG. 4—shows a flowchart showing the logical steps of the Method utilizing recognition of Product and project items and associated Information including but not limited to lists of items from many sources.

VIII. DETAILED DESCRIPTION OF THE PRESENT INVENTION AND DRAWINGS

The following detailed description, reference is made to the accompanying drawings which form a part hereof, and is incorporated, by way of illustration, specific embodiments in which the present invention may be practiced. Other embodiments may be utilized and structural changes may be made without departing from the scope of the present invention. Specific details are set forth herein in order to provide an understanding of various aspects of embodiments of the present invention. One or more embodiments of the present invention may be practiced without any of the one or more specific details. In other instances, in this application, well-known methods, procedures, and components have not been described in detail so as not to unnecessarily obscure aspects of embodiments of the present invention.

Detailed Description of FIG. 1

The present invention comprises a method for Simultaneously in one-step filling a Virtual Shopping Cart with many items from one or multiple resources at one time; all items of any type from all potential resources are embodied into a Customized List of All Items, which has been Simultaneously generated and sourced from all potential resources in one-step and then presented visually to the User in a unique format from which the User selects specific designated, approved and desired items, with distinction to the source, type or characteristics of those items; resulting in a Simultaneous one-step of moving all of the selected items into a single Virtual or Online. Shopping Cart for purchase or acquisition; ordered and/or ordered and paid for then allocated for acquisition and fulfillment of all items Simultaneously from as many sources as necessary.

Corresponding Description of Numbers in FIG. 1

101—initiating the system by: initiating and running of a specific software application on a User smart device, operated by at least one User, or downloading, registering for sign-in process, initiating and running of a specific software application on a User smart device, operated by at least one User;

105—Entering, scanning, submitting, or inputting of an initial list of items for a project(s) or product(s) or entering, scanning, submitting, or inputting of an initial project(s) or product(s) request by User and User requesting a Simultaneous search for purchase and/or acquisition of all the items or components needed to complete the specific project or product request by User;

110—searching for multiple vendors Simultaneously; and performing a search and communicating virtually with at least one source to request and receive the results of the User's said search request utilizing a unique process to create a first Customized List of All Items requested;

performing the following:

115—storing search results in at least one database;

120—accessing said at least one database or accessing and updating said at least one database;

125—retrieving the results of User's request(s) to be presented visually to the User in a unique format in the form of a first Customized List of All Items;

130—Visually displaying said first Customized List of All Items;

135—User selecting the desired Customized List of All Items;

140—modifying said first Customized List of All Items derived from said unique process presented visually to User in a unique format allowing for the User's customization, selection and approval;

145—applying User's constraints to said Customized List of All Items by User utilizing said User smart device running said specific and unique software process;

150—storing said modified Customized List of All Items in a unique format for visual presentation to said User in order for User to make a desired and approved selection;

155—adding a complete final or modified final Customized List of All Items of any types and from any sources Simultaneously to a Virtual or Online Shopping Cart in one-step;

160—Simultaneously in one-step filling a Virtual or Online Shopping Cart by the implementation of one of the following steps by said User, 165—Simultaneously in a single one-step moving the said final Customized List of All Items to the checkout or purchase process as follows: Simultaneously in a single one-step moving all the said Users' desired and approved items from a final Customized List of All Items to a Virtual or Online Shopping Cart utilizing said User's smart device running said specific unique software;

170—the generating of a new modified final Customized List of All Items by the steps of: generating said new modified Customized List of All Items by said User's reselection of desired and approved items any number of times by implementing any number of the above steps until said User creates said a desired and approved modified final Customized List of All Items for purchase and/or acquisition; and Simultaneously in a single one-step moving all items from said final or modified final Customized List of All Items to a Virtual or Online Shopping Cart said User smart device running said specific software application;

175—Acquiring and fulfilling all items as follows: taking all the items that are within the final or modified final customized list of all items that has been moved simultaneously in a single one-step to a single virtual or online shopping cart and ordered and/or ordered and paid for and allocating them for acquisition and fulfillment simultaneously from as many sources as necessary all at once.

FIG. 2—The Method in at least one embodiment is additionally comprised of populating a list of required or recommended items for creating a Product which is a First Customized List of All Items. Customized lists of All Items may include but are not limited to: items, recipes, projects, arts and crafts projects, home improvement projects, construction projects, products, outfits, and apparel and fashion ideas, class supplies, supplies, camp supplies, suggested menu items, creation, or designs and/or finished products of any kind. The required or recommended items may comprise of components and/or ingredients.

The steps involved in the Method may include as an example, a User visits a website, or may locate or find at least one of the following: a photograph, written or printed materials, product boxes, packaging, labels, books, point-of-sale materials, recipes, magazines, ads, websites, newspapers, products, items, sounds, images. Product package, recipes, magazines, advertisements, and newspapers, and using a Mobile Device or other Electronic Device, which together with Users input, request, and/or and communication with a computer, smart device, network and/or internet, are singularly or jointly capable of executing the The Method of the present invention.

In at least one embodiment the User, may in visiting a specific web-page or website, either search or browse through projects and the associated with lists of required or recommended items (2). Once the User selects a Project(s) or Product(s), the first Customized List of All Items Simultaneously populates (3) such display may include additional information about the item(s), including, but not limited to at least one of the following: price, brand, seller, and description of item, shipping cost and availability (4). User may select the items based on their personal preferences in terms of at least one of the following: price, quantity, stock keeping unit, time of delivery, availability, vendor, shipping costs, brand, manufacturer, retailer, distributor, size, and quality (5). The User may select either all items if the User wants to select all the items from the first Customized List of All Items Simultaneously to the User's single Virtual or Online Shopping Cart (6) or select the items that the User wants to add to the User's cart (7) or deselect items User does not want. The User may then add the final or modified final Customized List of All of Items to the User's Virtual or Online Shopping Cart all at once in a single one-step (8). After putting the items into the cart, the User has the option of: a) updating certain criteria such as the quantity of the items and/or other criteria, b) checking out, or c) continuing shopping (9), d) upon the User having Simultaneously moved a Final or Modified Final Customized List of All Items in one-step to the said cart then the process of acquiring and simultaneously fulfill all items of any type from all resources occurs. Number (10)—Acquiring and fulfilling all items as follows: taking all the items that are within the final or modified final customized list of all items that has been moved simultaneously in a single one-step to a single virtual or online shopping cart and ordered and/or ordered and paid for and allocating them for acquisition and fulfillment simultaneously from as many sources as necessary all at once.

FIG. 3—A User takes a picture or scans a product, such as a recipe, with a device (29), which comprises of Smart phones, tablets, other mobile devices with internet capabilities, and optical readers. The User may receive a list, which is generated by the device based on the contents of the recipe (30). The User may receive a Simultaneously populated Customized List of All Items of required or recommended items associated with the Customized List of All Items (31). The User may receive information about the items (32). Information about the items include, but are not limited to, price, brand, seller, description of item, shipping cost and availability. User may select the items based on their personal preferences in terms of at least one of the following: price, quantity, availability, vendor, shipping costs, brand, manufacturer, retailer, distributor, size, and quality (33) or choose to add all items to the User's Virtual or Online Shopping Cart (34). The User may then add the complete or Customized List of All Items to the User's Virtual or Online Shopping Cart (35). After selecting to auto populate items into the cart, the User has the option of updating the quantity and/or other criteria of the items, checking out, or continuing shopping (36). Number (37)—Acquiring and fulfilling all items as follows: taking all the items that are within the final or modified final customized list of all items that has been moved simultaneously in a single one-step to a single virtual or online shopping cart and ordered and/or ordered and paid for and allocating them for acquisition and fulfillment simultaneously from as many sources as necessary all at once.

FIG. 4—shows the flowchart of how QR Codes are utilized in this present invention. Other Product Information Types can be utilized in a similar manor. (which list) The QR code is linked to a Customized list. A User scans the QR code with an electronic device (22), the electronic device used comprises of at least one of the following: Smart phones, tablets, other mobile devices with internet capabilities, and optical readers. Upon scanning, the electronic device may display items needed based on the Customized List of All Items (23) and display information about the items (24). Information about the items include, but are not limited to, price, brand, seller, description of item, shipping cost and availability. User may select the items based on their personal preferences in terms of at least one of the following: price, quantity, availability, vendor, shipping costs, brand, manufacturer, retailer, distributor, size, volume, weight, and quality (25) or choose to add all items to the User's Virtual or Online Shopping Cart (26). The User may then add the complete or Customized List of All Items to the User's Virtual or Online Shopping Cart (27). After selecting to auto populate items into the cart, the User has the option of updating the quantity of the items and/or other criteria, checking out, or continuing shopping (28). Number (175)—Acquiring and fulfilling all items as follows: taking all the items that are within the final or modified final customized list of all items that has been moved simultaneously in a single one-step to a single virtual or online shopping cart and ordered and/or ordered and paid for and allocating them for acquisition and fulfillment simultaneously from as many sources as necessary all at once.

The QR code may be available on recipes. The serving, brand, and/or portion sizes of the recipe may be selected, adjusted, customized, and the items may then adjust Simultaneously based on the preferred portion or serving size. For example, a turkey meatloaf that serves eight people requires two pounds of ground turkey, but if the User only wants to make a turkey meatloaf that serves four people, the amount of ground turkey may Simultaneously adjust to one pound. The other ingredients may adjust to the proper amount as well. The User does not have to manually adjust the items, but may add or select the auto adjusted items be sent (one-step auto filled) to the User's shopping cart. The system may put the smallest saleable quantity into the cart.

The QR code may also be available for an outfit idea located or found in a written or printed materials, product boxes, packaging, labels, books, point-of-sale materials, recipes, magazines, ads, websites, newspapers, products, items, sounds, images. Once the QR code is scanned, all the items for the outfit are generated, as a pre-determined list, on the electronic device used to scan QR code. The User may select or customize the User's measurements for the various components of the outfit before selecting to auto add the components to the User's Virtual shopping cart.

The Method maybe executed on a Device such as a Mobile Device or computer with internet capabilities. The Method may be executed using a mobile application or the browser of the Mobile Device. The Method may also be applied in a variety of industries, including not limited to food, arts and crafts, fashion, construction, and home improvement.

The Method may include the process of being able to photo something like a recipe in a book for example (with your Device, Mobile Device, mobile phone or camera) optically scan (scan) it and turn it into a shopping list, that can be shopped using character and/or image recognition.

Definitions

These definitions are in addition to the words and phrases specifically defined in the body of this application. If there is an inconsistency between a definition in the body and a definition in this section the definition within the body of this application governs.

Acquired: ordered and/or ordered and purchased

Product: The finished or completed result from the utilization and combination of various items in accordance with and based upon instruction(s) or request(s) or search(s) related thereto.

Seller(s): a party that offers, or enters into contracts to make a sale to an actual or potential buyer; also, a vendor, distributor, wholesaler, licensee, licensor, manufacturer, or retailer.

Customized List of All Items: a group or List of All Items consisting of at least one item that is a uniquely created and new list.

First Customized List of Items: a list of all items requested, needed and/or required by User which have been simultaneously searched for and stored for presentation to User.

Final Customized List of Items: a list of all items desired, selected, and approved by User for acquisition.

Modified final Customized List of Items: a final Customized List of All Items desired, selected, and approved by User for acquisition which has been altered to select, add, deselect, or delete at least one item by User.

Mobile Device: is a generic term used to refer to a variety of devices that allow people to access data and information. A Mobile Device (can be also known as a handheld computing device, Hand-held device, handheld computer or simply handheld) can also be hand-held computing device, which can have a display screen which can also have a touch input and/or a miniature keyboard.

A handheld computing device: can have an operating system (OS), and usually can run various types of application software, known as apps. Most hand-held devices can also be equipped with WI-FI, Bluetooth and GPS capabilities that can allow connections to the Internet and other Bluetooth capable devices such as an automobile or a microphone headset.

A camera and/or media player feature for video or music files can also be typically found on these devices along with a stable battery power source. Other types of Mobile Devices include tablet computers. As in a personal digital assistant ("PDA"), the input and output are often combined into a touchscreen interface, Smartphones and PDAs Enterprise Digital Assistants may offer integrated data capture devices like barcode, RFID, optical, Optical Character Recognition, and smart card readers.

Quick Response Codes ("QR Codes"): QR Codes are a type of a matrix barcode, which are optical machine-readable labels that usually attached or printed to items that record information related to the item, list of items, project, product, and/or request. QR Codes are available in a variety of places, including, but not limited to written or printed materials, product boxes, packaging, labels, books, point-of-sale materials, recipes, magazines, ads, websites, newspapers, products, items, sounds, images. product package, recipes, magazines, advertisements, and newspapers.

Two-Dimensional Barcode ("2D Barcode"): a two-dimensional way to represent information both by vertical and horizontal patterns. 2D barcodes are also known as quick response codes because they enable fast data access. 2D barcodes are often used in conjunction with smart phones. The User simply photographs or scans a 2D barcode with the camera on a phone equipped with a barcode reader. The reader interprets the encoded URL, which directs the browser to the relevant information on a Web site, the web, internet or other virtual location. This capability has made 2D barcodes useful for mobile marketing. Some 2D barcode systems also deliver information in a message for Users without Web access.

Virtual: occurring, relating to, or existing within a Virtual reality or for all practical purposes an existence which is possible or inferred.

Items: any object of attention, concern, or interest Items may include but are not limited to supplies, elements, parts, ingredients, components, compounds, and products.

Outfits: a set of tools or equipment especially for the practice of a trade, also a clothing ensemble often for a special occasion or activity.

Device: Comprises of at least one of a Electronic Device, computer, Mobile Device, digital scanner, image scanner, scanner, handheld device, reader device, server, and/or Smart Device.

Electronic Device: a device that accomplishes its purpose electronically.

Digital Scanner. Image Scanner—an electronic device that generates a digital representation of an image for data input to a computer.

Product Information Types: QR Codes, 2D barcodes, ID barcodes, UPC Codes, MVS Mobile.

Visual Search, Linear barcodes, barcodes, International Standard Book Number ISBN codes, words, characters, photographs, drawings, images, spoken words, music, sounds, smells.

Product Information: Information on a Project(s), item, Product(s) or stored on associated packaging or within them or on Product Information Types.

Simultaneously: at the same time, or standard dictionary meaning.

Automatically: Simultaneously

One-step can also mean one stroke, one keystroke, one entry, pressing one button, or other methods of one-step collection.

What is claimed as being new and desired to be protected by Letters Patent of the United States is as follows:

1. A computer program product comprising a non-transitory computer readable medium implementing a method comprising:
   receiving a plurality of items associated with at least one of: a list, a project, a product, a kit, a recipe, a set of instructions, and a craft;
   selecting, by a user, a predetermined selection;
   simultaneously compiling, from a plurality of sellers, selection data associated with the plurality of items, wherein the selection data is at least one of: an item price, an item, brand, an item seller, an item description, a shipping cost, and an item availability;
   storing the selection data from the plurality of sellers in at least one database;
   selecting a customized selection, wherein the customized selection includes at least two items from the plurality of items wherein the selection data indicates that at least one item of the plurality of items is available from one or more item sellers;
   applying at least one group shipping discount associated with the plurality of items;
   applying a constraint to the customized selection based on a restricted substance associated with at least one item of the plurality of items and a user rating associated with at least one item of the plurality of items;
   updating the selection data associated with the plurality of items previously stored in the at least one database;
   adding the customized selection to a virtual shopping cart;
   completing a purchase of the customized selection from the plurality of items in the virtual shopping cart; and
   simultaneously fulfilling the purchase of the customized selection from the plurality of items in the virtual shopping cart from at least one of the plurality of sellers.

2. The method of claim 1, the selection data further comprising
   a substitute item wherein when it is determined the item availability of at least one item of the plurality of items is unavailable or out of stock,
   selecting the substitute item from the plurality of items, adding the substitute item to the virtual shopping cart, and completing a purchase of the substitute item from virtual shopping cart.

3. The method of claim 1, wherein the selection data associated with the plurality items further comprises of at least one of the following: an item quantity, an item quality, a shipping method, an item volume, an item weight, an item measurement, an item delivery time, an item vendor, an item manufacturer, an item retailer, an item distributor, and an item size.

4. The method of claim 3, wherein at least one of the item price and the item measurement is converted to a user selected at least one of: an equivalent foreign currency, a foreign measurement, a metric measurement, or SAE measurement;

and displayed to the user via a user interface.

5. The method claim 1, further comprising at least one of the following:

providing the User with an option to remove one or more items from the plurality of items before at least one of:

adding the plurality of items to a virtual shopping cart, and completing a purchase of the plurality of items in the virtual shopping cart;

allowing deselection of one or more items from the plurality of items;

adjusting the customized selection by determining at least one of a desired user selected item and an approved User selected item from the plurality of itemsbased on a list of previously purchased items, wherein the selection data further comprising at least one of the following: outfits, accessories, headwear, clothing, footwear, outerwear, apparel, fashion ideas, itemcreation, item design; and adjusting the plurality of items available in customized selection based on a users measurements.

6. The method of claim 5, further comprising at least one of:

selecting, by the user, the selection wherein selecting further comprises inputting information using one or more of: QR codes, 2D barcodes, ID barcodes,UPC Codes, MVS Mobile Visual Search, Linear barcodes, barcodes, International Standard Book Number ISBN codes, words, characters, photographs, drawings, images, spoken words, music, sounds, and smells.

7. The method of claim 1, further comprising:

storing at least one of the selection data, selected items, and purchased items associated with the plurality of items in a database;

the plurality of items further comprising at least one of the following: supplies, components, elements, compounds, segments, parts, and/or ingredients;

displaying information to a user via a user interface; and translating the displayed information into one or more languages.

8. The method of claim 1 further comprising at least one of the following:

scanning, by a user, at least one of: a product, a project, or list of items for the at least one product or project wherein the scanning is performed with at least one of the following: a mobile device, camera, device, scanner, smart device, computer, or electronic device.

9. A system for managing a virtual shopping cart, the system comprising a processor and a memory communicatively coupled to the processor having stored therein a program code which when executed by the processor, causes the system to:

receive a plurality of items associated with at least one of: a list, a project, a product, a kit, a recipe, a set of instructions, and a craft;

select, by a user, a predetermined selection;

simultaneously compile, from a plurality of sellers, selection data associated with the plurality of items, wherein the selection data is at least one of: an item price, an item, brand, an item seller, an item description, a shipping cost, and an item availability;

store the selection data from the plurality of sellers in at least one database;

select a customized selection, wherein the customized selection includes at least two items from the plurality of items, wherein the selection data indicates that at least one item of the plurality of items is available from one or more item sellers;

applying at least one group shipping discount associated with the plurality of items; apply a constraint to the customized selection based on a restricted substance associated with at least one item of the plurality of items and a user rating associated with at least one item of the plurality of items;

update the selection data associated with the plurality of items previously stored in the at least one database; add the customized selection to a virtual shopping cart;

complete a purchase of the customized selection from the plurality of items in the virtual shopping cart; and simultaneously fulfill the purchase of the customized selection from the plurality of items in the virtual shopping cart from at least one of the plurality of sellers.

10. The system of claim 9, the list further comprising at least oneof:

time needed to complete a project, time needed to manufacture at least one product, item cost, user age, user age group, item size, item quantity, item quantity in stock, component description, item quality, at least one substitute item, item shipping cost, item shipping method, item shipping options, at least one item dimension, item measurement, delivery date, delivery time, item calories, item mass, item weight, item density, at least one restricted substance, and personal preference.

11. The system of claim 9, further configured to:

display information to a user via a user interface; and translate the displayed information into one or more languages.

* * * * *